United States Patent [19]
Kerr

[11] Patent Number: 4,635,221
[45] Date of Patent: Jan. 6, 1987

[54] FREQUENCY MULTIPLEXED CONVOLVER COMMUNICATION SYSTEM

[75] Inventor: Leo A. Kerr, Woodstock, Md.

[73] Assignee: Allied Corporation, Morristown, N.J.

[21] Appl. No.: 692,798

[22] Filed: Jan. 18, 1985

[51] Int. Cl.$^4$ .................. H03K 3/00; G06G 7/195
[52] U.S. Cl. .................................. 364/821; 333/195
[58] Field of Search ............... 364/819, 820, 821, 825;
329/117, 118; 375/1, 14, 94, 96, 110, 58;
333/193, 195

[56] References Cited

U.S. PATENT DOCUMENTS

| | | | |
|---|---|---|---|
| 4,071,828 | 1/1978 | Setrin | 375/1 |
| 4,115,865 | 9/1978 | Beauvais | 364/821 |
| 4,300,235 | 11/1981 | Outram | 375/1 |
| 4,382,232 | 5/1983 | Laurent | 329/117 |
| 4,428,062 | 1/1984 | Michaels | 364/821 |
| 4,458,328 | 7/1984 | Kino | 375/14 |

Primary Examiner—Michael R. Fleming
Attorney, Agent, or Firm—Robert M. Trepp; Bruce L. Lamb

[57] ABSTRACT

A spread spectrum communication system is described for decoding data from a signal having a carrier frequency and at least one of a plurality of predetermined orthogonal modulations thereon incorporating a frequency synthesizer for generating a plurality of frequencies, a plurality of mixers, a combiner, a broadband convolver, a second combiner coupled to a reference signal generator for generating respective orthogonal modulations on spaced apart carrier frequencies, a power divider coupled to the output of the convolver and filters each having a frequency passband for recovering or separating the output signals of the convolver. The invention overcomes the problem of requiring a plurality of broadband convolvers to decode a plurality of orthogonal modulations of lesser bandwidth.

14 Claims, 8 Drawing Figures

FREQUENCY MULTIPLEXED CONVOLVER COMMUNICATION SYSTEM

BACKGROUND OF THE INVENTION

1. Field of the Invention

This invention relates to spread spectrum communication systems and more particularly to a receiver for decoding several signals having different spreading functions concurrently using a single convolver.

2. Description of the Prior Art

M-ary Orthogonal Keying (MOK) data modulation is a technique used in spread spectrum communications where one basic spreading function, such as a pseudo noise (PN) sequence is phase modulated on a carrier. The spreading function is modified by certain other functions, such as Walsh functions to cause a modulation orthogonal to the basic function and every other modulating function used. The resultant response of a signal in a channel filtered in a matched filter to an orthogonally modulated signal is zero, while the response in a matched filter to nonorthogonal signals is maximum. The modulation of the spreading function with orthogonal functions is used extensively in secure communications, both for continuous communications and short message formats. Spreading the small amount of information pseudo randomly over a wide bandwidth allows a low probability of intercept (LPI) since the signal power density can be below the noise power density. Only by knowing the spreading function can the signal energy be integrated above the noise.

Presently, orthogonal keyed data is recovered by implementing parallel decoding devices, such as correlators or convolvers and then comparing the filtered amplitudes as in a Mark and Space receiver. Using higher M-ary than binary orthogonal keyed (BOK) data modulations at low bandwidths, where processing at base band is practical, parallel processing for decoding the orthogonal modulations using partial sums from a single decoder of the basic PM spreading function is sometimes implemented.

For medium bandwidth modulation, where the spreading function is changing after short intervals, convolvers are generally used. One example of a surface acoustic wave convolver is described in U.S. Pat. No. 4,428,062 which issued on Jan. 24, 1984 to P. A. Michaels and assigned to The Bendix Corporation. In '062 two transducers are shown spaced apart for launching surface acoustic waves along a path between the two transducers. The interaction of the surface acoustic waves causes a voltage at each point which is collected by a metal conductor overlying the interaction region. A convolver such as described in '062 is capable of much wider bandwidths than can be obtained in base band processing. At present the excess bandwidth over that required for modulation decoding is not used.

It is therefore desirable to utilize the available bandwidth of a convolver by frequency multiplexing several signals within this bandwidth.

It is further desirable to provide convolution of an input signal on four different i.f. carriers with four orthogonally modulated reference signals on four i.f. carriers in a broadband convolver.

It is further desirable to utilize a combiner for combining several input signals at different frequencies to one input of a broadband convolver while coupling the other input of the convolver with a plurality of reference signals at the same frequencies, but with respective time reversed modulations.

It is further desirable to provide a spread spectrum communication system having a broadband convolver which is simultaneously used for convolving a plurality of input signals with a plurality of reference signals.

It is further desirable to filter the output of a broadband convolver simultaneously convolving a plurality of signals to recover the convolution of the input signal with selected reference signals.

It is further desirable to provide a spread spectrum communication system having an input signal modulated by at least one of a plurality of predetermined orthogonal modulation functions by simultaneously convolving the input signal with a plurality of reference signals, each having a respective modulation and for recovering the convoluted data by filtering and detecting the output of the convolver for each respective modulation function that correspond to different carrier frequencies.

SUMMARY OF THE INVENTION

An apparatus and method is described for recovering data from a first signal having a carrier frequency and at least one of a plurality of predetermined orthogonal modulations thereon, comprising a plurality of mixers each having an input coupled to said first signal and a second input coupled to one of a plurality of spaced apart first frequencies to provide a plurality of second signals at a plurality of predetermined spaced apart second frequencies, a combiner for combining said plurality of second signals to form a third signal, a convolver having a first and second input for convolving signals coupled to the first and second inputs and an output terminal, the first input of the convolver being coupled to the third signal, a reference signal generator for generating a plurality of fourth signals at at least two of said plurality of predetermined spaced apart second frequencies, a balanced modulator for modulating each of the fourth signals with respective ones of the plurality of orthogonal modulations functions to provide a plurality of fifth signals, a combiner for combining the plurality of fifth signals to form a sixth signal, the sixth signal coupled to the second input of the convolver, a divider for dividing the power of the seventh signal at the output terminal of the convolver to form a plurality of eight signals, a filter for filtering each of the plurality of eighth signals with a respective frequency bandpass to provide a plurality of ninth signals, whereby the convolution of respective orthogonal modulations with the first signal is obtained.

DESCRIPTION OF THE PREFERRED EMBODIMENT

Figure 1:
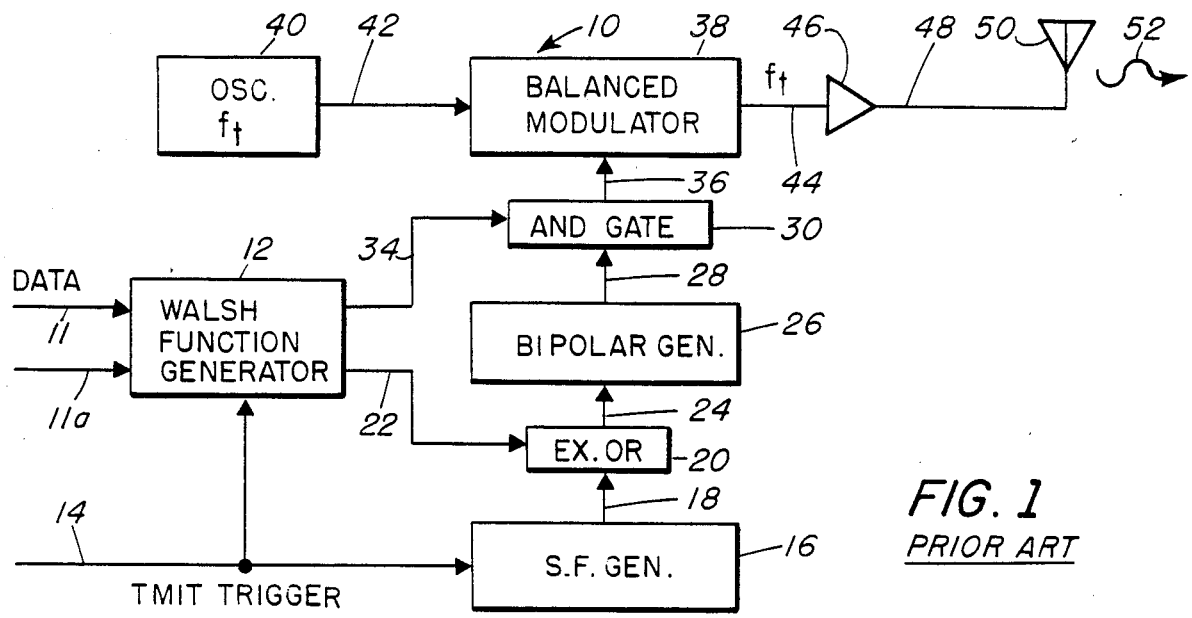
FIG. 1 is a block diagram of one embodiment of a spread spectrum signal generator.

Referring to the drawing, and more particularly to FIG. 1, a block diagram of a spread spectrum signal generator 10 is shown. Spread spectrum signal generator 10 may, for example, generate a signal suitable for transmitting. The signal may consist of a carrier with 128 chips of spreading function data. The chips of data may be binary phase shift keyed (BPSK) and modulated with a pseudo random noise (PN) spreading function (SF). The spreading function may be 4-ary orthogonally keyed (4-OK) data modulated. The 4-ary orthogonally keyed data modulation may, for example, be Walsh functions shown by curves 32, 54–56 in FIGS. 2A–2D. As shown in FIG. 1 data is coupled over lines 11 and 11a to an input of Walsh function generator 12. Walsh function generator 12 functions to generate the waveforms shown in FIGS. 2A–2D from the two line code on lines 11 and 11a, providing four different combinations of voltage levels corresponding to each of four Walsh function modulations. A control signal TMIT TRIG, such as a pulse, is coupled over line 14 to an input of Walsh function generator 12 and spreading function generator 16. Spreading function generator 16 functions to generate a serial code, 128 chips long, which may simulate pseudo random noise (PN). The output of spreading function generator 16 is coupled over line 18 to an input of Exclusive-OR circuit 20. The binary code, pseudo random noise, is modulated by Exclusive-OR circuit 20 by the sequence generated by the Walsh function generator 12 to add the data modulation. An output of Walsh function generator 12 is coupled over line 22 to a second input of Exclusive-OR circuit 20. Exclusive-OR circuit 20 functions to provide the product of the input signal on line 18 and the input on line 22, both of which are binary signals. The output of Exclusive-OR circuit 20 is coupled over line 24 to an input of bipolar generator 26.

Figure 2A:
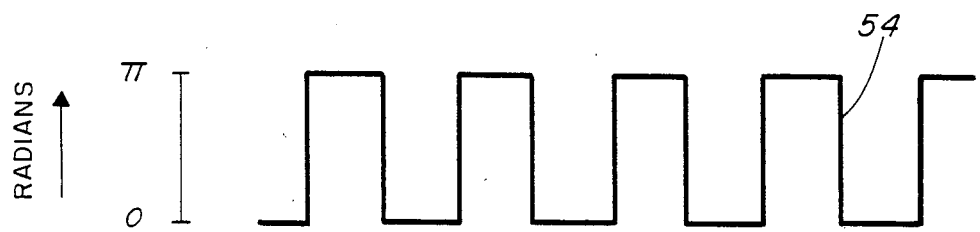
FIGS. 2A through 2D show curves of a Walsh function.
Figure 2B:
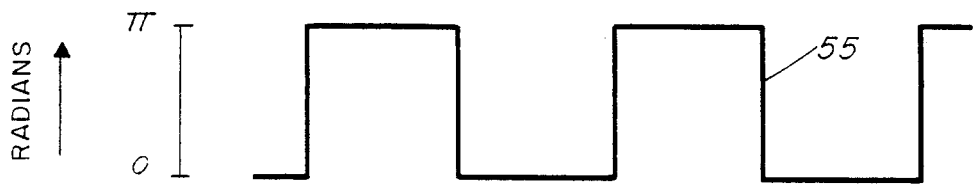
Figure 2C:
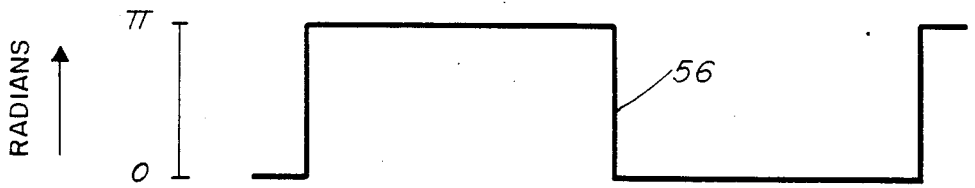
Figure 2D:
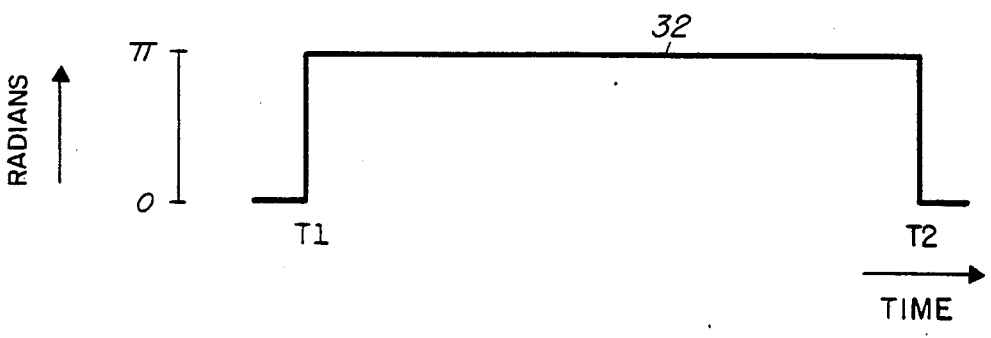

Bipolar generator 26 functions to provide a voltage translation to a digital signal typically represented by a plus voltage and zero volts to a bipolar signal represented by a plus volts and a minus volts or a logic one and zero, respectively. The output of bipolar generator 26 is coupled over line 28 to an input of gate 30. A second input of Walsh function generator 12 having an output waveform, such as shown by curve 32 in FIG. 2D, is coupled over line 34 to a second input of gate 30. Gate 30 functions to eliminate circuit transient states from bipolar generator 26 by time gating the signal on line 28 with the signal on line 34. The output of gate 30 is coupled over line 36 to an input of balance modulator 38.

Oscillator 40 functions to provide a carrier frequency $f_t$ which may be a radio frequency or microwave frequency. The output of oscillator 40 is coupled over line 42 to an input of balance modulator 38. The signal on line 36 modulates the carrier frequency $f_t$ on line 42 to provide a carrier frequency $f_t$ at its output on line 44 which has been modulated such as phase modulated. The modulated carrier frequency is amplified by amplifier 46 and coupled over line 48 to antenna 50 which functions to radiate the modulated carrier frequency as a radio wave or microwave signal shown by arrow 52.

Referring to FIGS. 2A–2D, curves 54, 55, 56 and 32 show Walsh function waveforms which are generated by Walsh function generator 12 and coupled over line 22 to Exclusive-OR circuit 20. In FIGS. 2A–2D the ordinate represents phase and the abscissa represents time. Waveforms of some other functions may be used in place of Walsh functions to provide a similar response.

Figure 3:
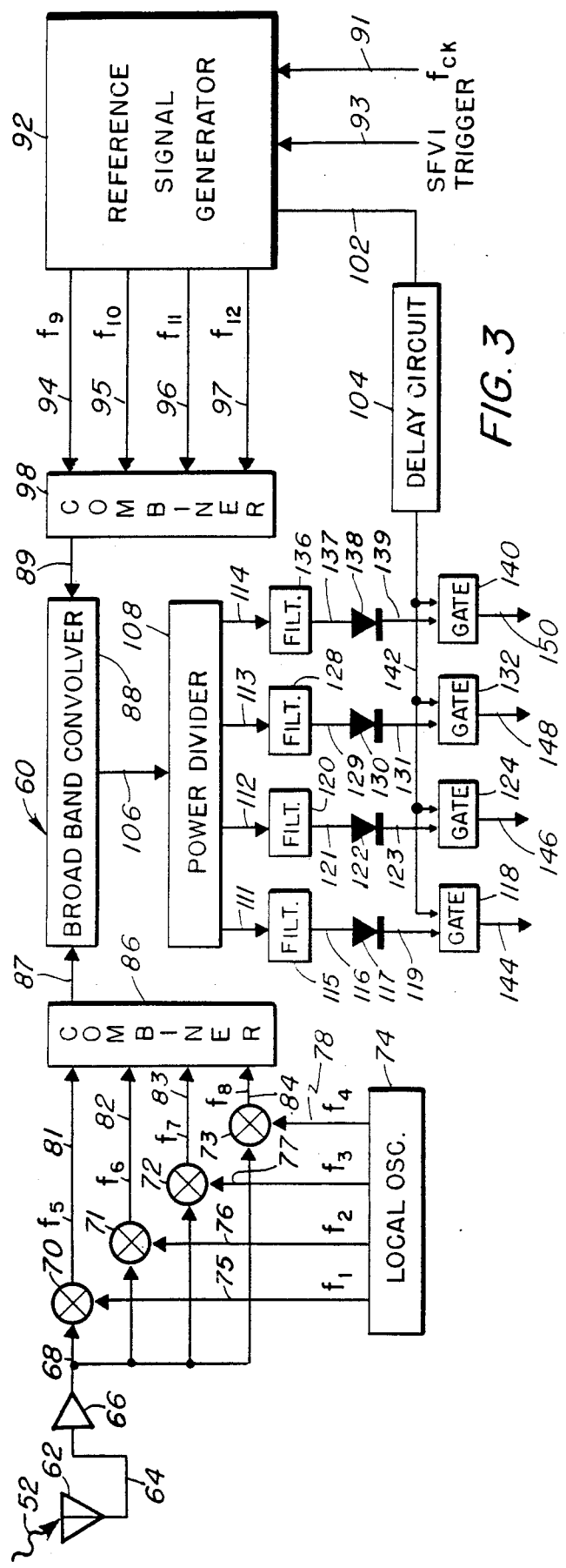
FIG. 3 is a block diagram of one embodiment of the invention.

FIG. 3 is a block diagram of a spread spectrum receiver 60. Radio signal 52, having a carrier frequency $f_t$ and at least one of a plurality of predetermined orthogonal modulations thereon, is received by antenna 62 and coupled over line 64 to the input of amplifier 66. Amplifier 66 functions to amplify the received signal and to couple the amplified received signal over line 68 to an input of mixers 70–73. Local oscillator 74 functions to provide frequencies $f_1$ through $f_4$ over lines 75–78 to a second input of mixers 70–73, respectively. Frequencies $f_1$–$f_4$ are spaced apart. Mixers 70–73 convert the incoming radio signal on line 68 to an intermediate frequency. The output of mixers 70–73 having an intermediate frequency $f_5$ to $f_8$, respectively, are coupled over lines 81–84, respectively, to respective inputs of combiner 86. Combiner 86 functions to combine the signals on lines 81–84 to provide a composite signal at its output over line 87 which is coupled to a first input of broadband convolver 88.

Figure 5:
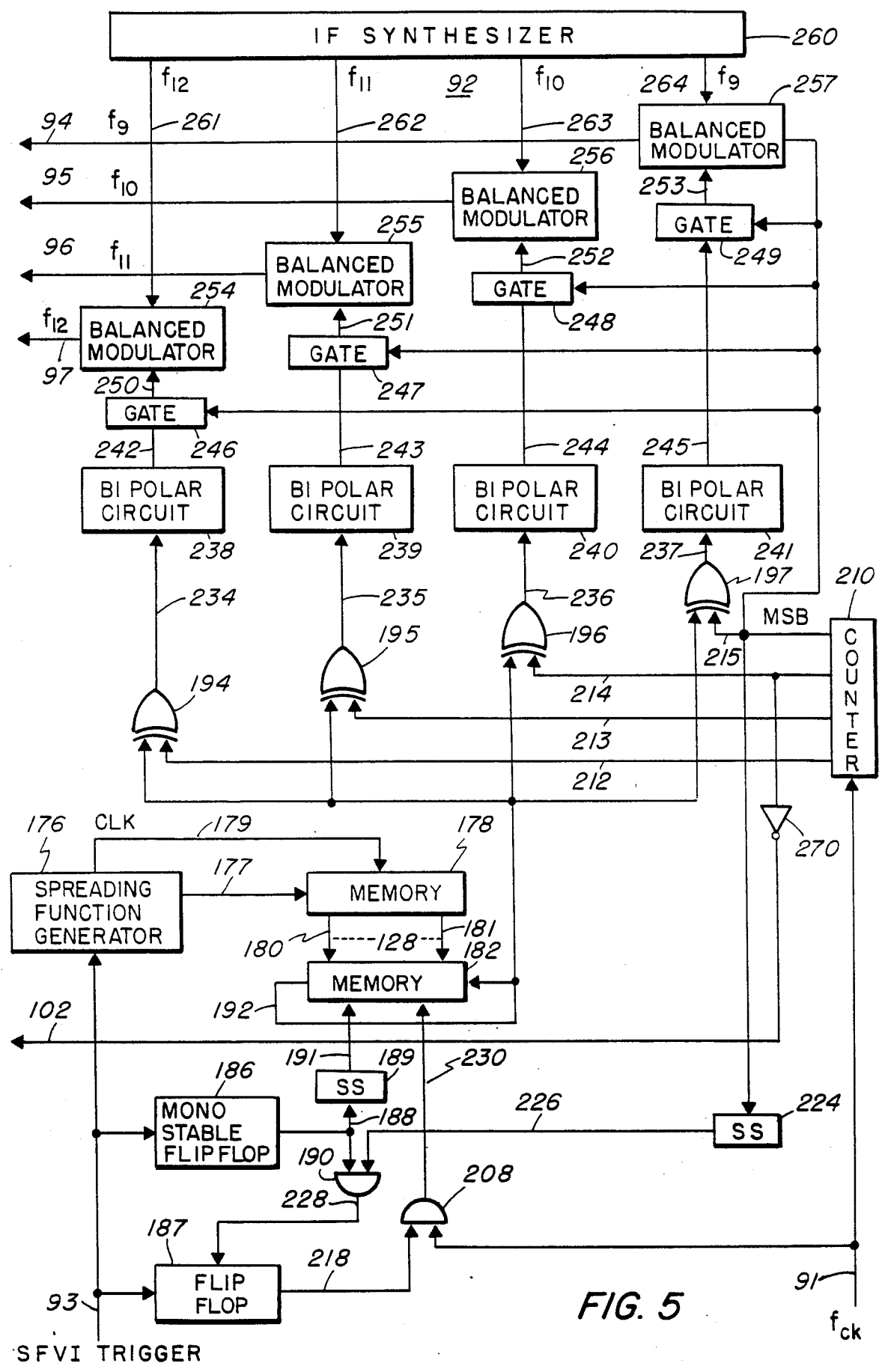
FIG. 5 is a block diagram of one embodiment of a reference signal generator.

Broadband convolver 88 has a second input signal coupled over line 89 from combiner 98 which couples the reference signals to be convolved with the signals or composite signal or line 87. Reference signal generator 92 has a control signal (spreading function validity interval trigger) SFVI TRIGGER coupled over line 93 to a control input. A clock signal $f_{ck}$ is coupled over line 91 to a control input of Reference Signal Generator 92. Reference signal generator in response to SFVI TRIGGER generates, for example, a pseudo random noise serial binary phase code 128 chips, which is further phase modulated by orthogonal functions, such as Walsh functions. The phase modulated pseudo random noise serial code is then used to modulate four frequencies, $f_9$ to $f_{12}$ which are coupled over lines 94–97, respectively, to respective inputs of combiner 98. One embodiment of reference signal generator 92 is shown in FIG. 5. A timing signal which may be, for example, a waveform of a Walsh function is coupled over line 102 to an input of delay circuit 104.

Combiner 98 functions to combine the radio wave or microwave signals having carrier frequencies $f_9$–$f_{12}$ and having respective orthogonal modulations. The output of combiner 98 provides a composite signal over line 89 to an input of broadband convolver 88.

The output of broadband convolver 88, which functions to convolve the signals on lines 87 and 89, is coupled over line 106 to an input of power divider 108. Power divider 108 functions to power divide the signal on line 106 and to provide the signal at its output on lines 111–114. The signal on line 111 is coupled through filter 115 over line 116 through detector diode circuit 117 over line 119 to an input of gate 118. The signal on line 112 is coupled through filter 120 over line 121 through detector diode circuit 122 over line 123 to an input of gate 124. The signal on line 113 is coupled through filter 128 over line 129 through detector diode circuit 130 over line 131 to an input of gate 132. The signal on line 114 is coupled through filter 136 over line 137 through detector diode circuit 138 over line 139 to an input of gate 140.

Filters 115, 120, 128 and 136 each have a predetermined passband to separate from the output signal on line 106 or 111 the output signal corresponding to the convolution of two selected signals, such as the signals on lines 81 and 94, where frequency $f_5$ is equal to frequency $f_9$. The output frequency on line 116 corresponding to the convolution of signals at $f_5=f_9$ is $2f_5$ due to this convolution process plus any doppler frequency thereon. The separated output signal on line 116 is detected by detector diode circuit 117 to provide an amplitude signal on line 119. Filter 120 may have a passband for separating the output signal on line 112 corresponding to the convolution of two selected signals, for example the signals on lines 82 and 95, where frequency $f_6$ and $f_{10}$ are substantially the same. The output of filter 120 is detected by detector diode circuit 122 to provide an amplitude output on line 123. Likewise, filter 128 has a predetermined passband for separating the output signal on line 106 corresponding to the convolution of the signals on lines 83 and 96, where $f_7$ is substantially equal to the frequency of $f_{11}$. Likewise, filter 136 has a predetermined passband for separating the output signal on line 106 or 114 corresponding to the convolution of the signals on lines 84 and 97, where frequency $f_8$ is substantially equal to frequency $f_{12}$.

Detector diode circuits 130 and 138 function to detect the output signals of filters 128 and 136, respectively, to provide an amplitude signal on lines 131 and 139, respectively. The output of delay circuit 104 is coupled over line 142 to a second input of gates 118, 124, 132 and 140. Gates 118, 124, 132 and 140 function to prevent or eliminate spurious signals, since the convolution output waveform is shorter in duration, one-half shorter, than the duration of the waveforms at lines 87 or 89. This process also adds the carrier frequencies and any doppler frequency thereon. Delay circuit 104 functions to adjust the time of gating on line 142 with the delay time in broadband convolver 88 due to propagation of the waves prior to the output of a convoluted signal on line 106. The output of gates 118, 124, 132 and 140 is coupled over lines 144, 146, 148 and 150, respectively. The output on lines 144, 146, 148 and 150 provide a signal which may be an analog voltage representative of the convolution of an input signal with respective orthogonal modulations, such as Walsh functions 2A-2D.

Figure 4:
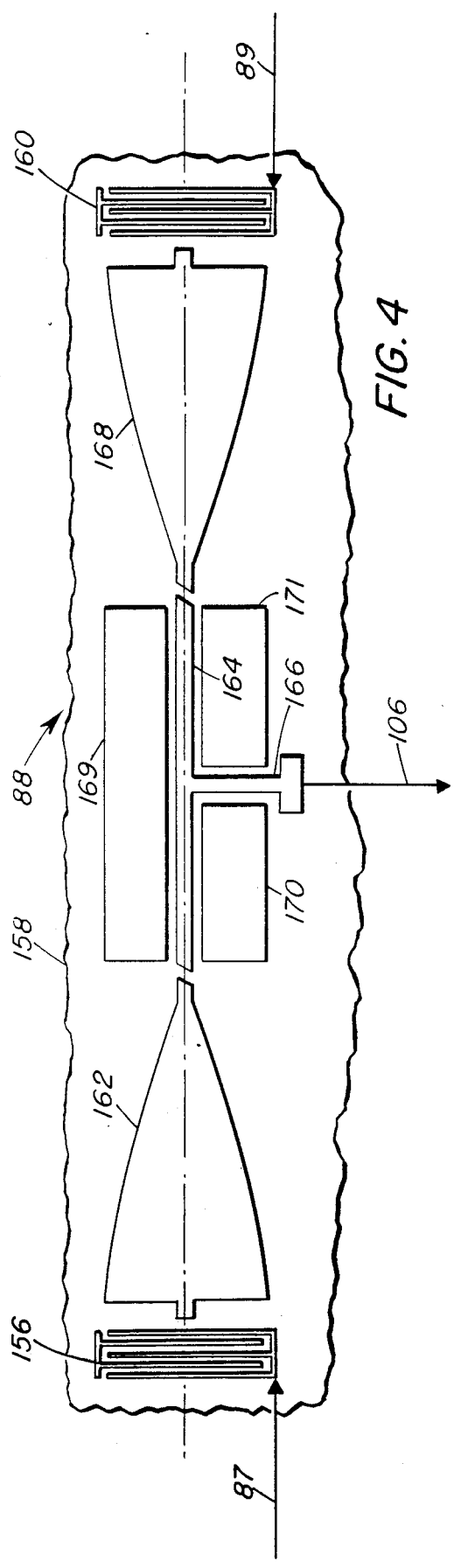
FIG. 4 is a top view of one embodiment of a broadband convolver.

One example of a broadband convolver 88 is described in U.S. Pat. No. 4,428,062 which issued on Jan. 24, 1984 to P. A. Michaels and assigned to The Bendix Corporation. FIG. 4 is a top view of the broadband convolver described in U.S. Pat. No. 4,428,062. Briefly, line 87 is coupled to transducer 156 which functions to launch a surface acoustic wave in piezoelectric substrate 158 in the direction towards transducer 160. Horn 162 functions to compress the surface acoustic wave energy along the path covered by metallization 164. Metallization 164 sums the voltage along piezoelectric substrate due to the interaction of a surface acoustic wave launched from transducer 160. Metallization 166 is coupled to metallization 164 to couple the voltage out to a terminal suitable for connecting to line 106. Horn 168 functions to compress the surface acoustic wave launched by transducer 160. Metallizations 169, 170 and 171 are coupled to ground and function to guide the surface acoustic wave energy undisturbed between transducers 156 and 160.

Referring to FIG. 5 a block diagram is shown of one embodiment of reference signal generator 92. Spreading function generator 176 generates a predetermined spreading function, such as a pseudo random noise binary code which may be the same code as generated by spreading function generator 16 shown in FIG. 1. The binary code may be 128 chips long and coupled over line 177 to an input of memory 178. A clock over line 179 is coupled to a clock input of memory 178. Memory 178 may be, for example, a serial in, parallel out shift register. Memory 178 transfers the data over lines 180 and 181 to the data input of memory 182. Memory 178 may transfer the data in parallel, that is 128 chips are loaded in parallel into memory 182. Memory 182 may be a parallel in, serially out shift register. Spreading function generator 176 responds to spreading function validity interval (SFVI) trigger which is coupled over line 93. In response to receiving SFVI trigger spreading function generator 176 generates a new code of 128 chips which is loaded in serial into memory 178 where memory 178 is a serial in, parallel out shift register. Control signal SFVI trigger is also coupled to monostable flip flop 186 and to flip flop 187. The output of monostable flip flop 186 is coupled over line 188 to an input of single shot circuit 189, which generates a single pulse in response to the output of flip flop 186. Line 188 is also coupled to an input of AND gate 190. The output of single shot circuit 189 is coupled over line 191 to the control input for loading memory 182. Monostable flip flop 186 functions to provide a delay until memory 178 is loaded with a new 128 chip code. Single shot 189 then provides a pulse to memory 182 which loads the 128 bit code into memory 182. The output of memory 182 is coupled over line 192 to a serial data input of memory 182 and to a first input of Exclusive-OR circuits 194 through 197.

The spreading function stored in memory 182 is held so that it can be timed properly with four Walsh functions corresponding to the Walsh function modulations of the expected received signal, which is shown in FIGS. 2A-2D. A clock signal $f_{ck}$ which may be, for example, 8 MHz is coupled over line 91 to an input of AND gate 208 and to the clock input of counter 210. Counter 210 may be, for example, an eight stage counter counting up to $2^8$ counts. Since the clock signal $f_{ck}$ is equal to the chip rate of the expected received signal, then counter 210 will count up, causing the most significant bit (MSB) of counter 210 to have a half period equal to 128 chips, which is the desired symbol length and one of the four Walsh function modulations shown by curve 32 in FIG. 2D. The next three less significant bits of counter 210 have waveforms as shown by curves 54-56 in FIGS. 2A-2C, respectively. By using the complement output of a stage of counter 210, the Walsh function modulations may be effectively reversed in time. Thus, the true output of the MSB stage and the complement output of the second through fourth most significant bit stages of counter 210 provide the four Walsh functions which have been time reversed for the desired reference signal. The output of the four most significant bits of counter 210 are coupled over lines 212-215 to a second input of Exclusive-OR circuits 194-197, respectively. The most significant bit is coupled over line 215. Exclusive-OR circuit 197 may be unnecessary since Walsh function zero is used but circuit 117 is shown for the general case should a higher order function be used.

In order to insure that clocking of the spreading function waveform stored in memory 182 is synchronized with the Walsh functions on lines 212-215 from the counter 210, clock pulses on line 91 are gated through AND gate 208 which has a second input from flip flop 187 over line 218. Flip flop 187 which is set by SFVI trigger on line 93 functions to inhibit clock signals $f_{ck}$ from passing through AND gate 208 until the new spreading function code has been loaded into memory 182 and until the appropriate phase of the Walsh functions from counter 210 occur. Monostable flip flop 186 provides a One output on line 188 at times after SFVI trigger. The most significant bit of counter 210 is coupled over line 215 to an input of single shot circuit 224. Single shot circuit 224 provides a pulse on line 226 upon receiving a positive-going leading edge on line 222. The time of a positive-going leading edge on line 215 corresponds to curve 32 in FIG. 2D at time $T_1$. The pulse on line 226 is coupled to a second input of AND gate 190 which provides an output on line 228 to flip flop 187 which sets flip flop 187 to a One, providing a logic One signal on line 218. Thus at time $T_1$ AND gate 208 passes clock signal $f_{ck}$ over line 230 to the clock input of memory 182 which clocks the code out of memory 182 over line 192 time reversed. Thus, the spreading function code is clocked out of memory 182 in time reverse order at the chip rate coincident with the Walsh functions provided from counter 210. These waveforms are effectively multiplied together by Exclusive-OR circuits 194–197 to form the four orthogonally coded spreading functions over lines 234–237, respectively. The signals on lines 234–237 are coupled through bipolar circuits 238–241, respectively, over lines 242–245, respectively, to an input of gates 246–249, respectively. Bipolar circuits 238–241 function to provide an output signal of plus V volts and minus V volts representative of a logic One and a logic Zero. Gates 246–249 have a second input coupled to line 215 which provides a waveform corresponding to curve 32 in FIG. 2D, which may be the symbol length of 128 chips. The output of gates 246–249 are coupled over lines 250–253, respectively, to an input of balanced modulators 254–257, respectively.

Intermediate frequency synthesizer 260 functions to generate four frequencies $f_9$–$f_{12}$ which are spaced apart coupled over lines 261–264, respectively, to a second input of balanced modulators 254–257, respectively. Balanced modulators 254–257 function to modulate the carrier frequencies $f_9$–$f_{12}$ with the four orthogonally coded spreading functions on lines 250–253 to provide reference signals on lines 94–97, which have respective orthogonally coded spreading functions which are time reversed.

The second most significant bit of counter 210, line 214, is coupled to an input of inverter 270 having an output coupled over line 102. The waveform on line 102 corresponds to curve 56 in FIG. 2C and provides a gating waveform to eliminate the spurious signals at AND gates 118, 124, 132 and 140 shown in FIG. 3.

Referring now to FIGS. 3 and 5, an apparatus and method is described for performing the convolution of an input signal on four different intermediate frequency carriers with four orthogonally modulated reference signals on the four intermediate frequencies respectively forming the reference signal. The composite input signal and reference signal are coupled to respective inputs of a broadband convolver which provides an output signal indicative of the convolution of the input and reference signals. The output signal is divided into four paths and separated by bandpass filters 115, 120, 128 and 136. The signals at the output of the bandpass filters are amplitude detected by detector diode circuits 117, 122, 130 and 138. The modulation is determined by which channel lines 119, 123, 131 and 139 has the greatest amplitude at the time of the compressed or peak of the convolution output of the spread spectrum input signal since each intermediate frequency is associated with a respective Walsh function shown by curves 54, 55, 56 and 32 in FIGS. 2A–2D, respectively.

Since the output of the convolver is a function of the composite input signal and the composite reference signal propagating at the same velocity in the broadband convolver 88 in opposite directions, it has the effect of speeding up time so that the convolved output waveform occurs in half the time. The spurious signals occurring in the other time portions is eliminated by gates 118, 124, 132 and 140 which are controlled on line 142, for example, by the second most significant bit in counter 210 having a waveform shown by curve 56 in FIG. 2C.

The invention describes an apparatus and method for recovering data from a first signal having a carrier frequency and at least one of a plurality of predetermined orthogonal modulations thereon comprising means for mixing the first signal with a plurality of spaced apart first frequencies to provide a plurality of second signals at a plurality of predetermined spaced apart second frequencies, means for combining the plurality of second signals to form a composite third signal, a convolver having a first and second signal input for convolving signals coupled to said first and second signal inputs and an output terminal, means for coupling the third signal to the first signal input of the convolver, means for generating a plurality of fourth signals at at least two of the plurality of predetermined spaced apart second signals, means for modulating each of the fourth signals with respective ones of the plurality of orthogonal modulation to provide a plurality of fifth signals, means for combining the plurality of fifth signals to form a composite sixth signal, means for coupling the sixth signal to the second signal input of the convolver, means for dividing the power of the seventh signal at the output of the convolver to form a plurality of eighth signals, means for filtering each plurality of eighth signals with a respective frequency bandpass to provide a plurality of ninth signals representative of the convolution of respective orthogonal modulations with the first signal.

The invention is not limited to orthogonal modulation bits or even equal symbol lengths but applies to other modulations as well. The invention is applicable to binary phase modulation, minimum shift keyed modulation, linear frequency modulation, etc. The number of multiplexed frequency channels is only limited by the bandwidth of the resultant waveform and the frequency bandwidth of the broadband convolver.

The invention claimed is:

1. Apparatus for recovering data from a first signal having a carrier frequency and at least one of a plurality of predetermined orthogonal modulations thereon comprising:

first means for generating a plurality of spaced apart first frequencies, means for mixing said first signal with each of said plurality of spaced apart first frequencies to provide a plurality of second signals at a plurality of predetermined spaced apart second frequencies, means for combining said plurality of second signals to form a third signal, a convolver having a first and second input for convolving signals and having an output terminal, means for coupling said third signal to said first signal input of said convolver, means for generating a plurality of fourth signals at at least two of said plurality of predetermined spaced apart second frequencies, second means for generating said plurality of predetermined orthogonal modulations, means for modulating each of said fourth signals with respective ones of said plurality of orthogonal modulations to provide a plurality of fifth signals, means for combining said plurality of fifth signals to form a sixth signal, means for coupling said sixth signal to said second input of said convolver to provide a seventh signal at said output terminal indicative of the convolution of said third and sixth signals, means for dividing the power of said seventh signal to form a plurality of eighth signals, and means for filtering each plurality of eighth signals with a respective frequency bandpass to provide a plurality of ninth signals representative of the convolution of reference signals having respective orthogonal modulations with said first signal.

2. The apparatus of claim 1 further including means for detecting the amplitude of said plurality of ninth signals to form a plurality of tenth signals.

3. The apparatus of claim 2 further including means for gating said plurality of tenth signals with one of said modulation functions delayed by a predetermined time interval to provide a plurality of eleventh signals.

4. The apparatus of claim 1 wherein said convolver includes a surface acoustic wave convolver.

5. The apparatus of claim 1 wherein said convolver includes a surface acoustic wave convolver having a first and second broadband transducer spaced apart and an interaction region therebetween for summing the voltages in the interaction region due to the propagation of surface acoustic waves launched by said first and second transducers.

6. The apparatus of claim 1 wherein said orthogonal modulations are Walsh functions.

7. The apparatus of claim 1 wherein said convolver has a predetermined bandwidth for convolving signals and wherein said plurality of second frequencies are within said bandwidth.

8. The apparatus of claim 1 wherein said means for modulating includes a plurality of balanced modulators.

9. The apparatus of claim 1 wherein said means for modulating includes modulating with said plurality of orthogonal modulations reversed in time.

10. The apparatus of claim 1 wherein said means for modulating includes modulating with at least one of said plurality of orthogonal modulations reversed in time.

11. A method for recovering data from a first signal having a carrier frequency and at least one of a plurality of predetermined orthogonal modulations thereon comprising the steps of generating a plurality of spaced apart first frequencies, mixing said first signal with each of said plurality of spaced apart first frequencies to provide a plurality of second signals at a plurality of predetermined spaced apart second frequencies, combining said plurality of said second signals to form a third signal, generating a plurality of fourth signals at at least two of said plurality of predetermined spaced apart second frequencies, generating said plurality of predetermined orthogonal modulations, modulating each of said fourth signals with respective ones of said plurality of orthogonal modulation to provide a plurality of fifth signals, combining said plurality of fifth signals to form a sixth signal, convolving said third and said sixth signal to provide a seventh signal indicative of the convolution of said third and sixth signals, dividing the power of said seventh signal to form a plurality of eighth signals, and filtering each plurality of eighth signals with a respective frequency bandpass to provide a plurality of ninth signals representative of the convolution of reference signals having respective orthogonal modulations with said first signal.

12. The method of claim 11 further including the step of detecting the amplitude of said ninth signals to form a plurality of tenth signals.

13. The method of claim 12 further including the step of gating said plurality of tenth signals with one of said modulation functions delayed by a predetermined time interval to form eleventh signals.

14. The method of claim 11 wherein said step of convolving includes applying said third and sixth signals to the first and second input of a surface acoustic wave convolver having a first and second transducers coupled to said first and second input respectively for launching surface acoustic waves along a path between said first and second transducers.

* * * * *